(12) United States Patent
Rytina et al.

(10) Patent No.: US 7,912,079 B2
(45) Date of Patent: Mar. 22, 2011

(54) SYSTEM AND METHOD OF COMMUNICATING A PRIORITY INDICATION IN A CALL CONTROL/BEARER CONTROL TELECOMMUNICATION SYSTEM

(75) Inventors: Ian Rytina, Carlton (AU); Leslie Gary Graf, Balwyn (AU); Mark Alan Hollis, Park Orchards (AU); Christian Norman Groves, Newport (AU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1924 days.

(21) Appl. No.: 10/494,831

(22) PCT Filed: Nov. 12, 2001

(86) PCT No.: PCT/IB01/02118
§ 371 (c)(1),
(2), (4) Date: Sep. 13, 2004

(87) PCT Pub. No.: WO03/043368
PCT Pub. Date: May 22, 2003

(65) Prior Publication Data
US 2005/0013315 A1    Jan. 20, 2005

(51) Int. Cl.
*H04L 12/40* (2006.01)
(52) U.S. Cl. ......... 370/439; 709/227; 370/443; 370/235

(58) Field of Classification Search ............... 370/352, 370/356, 395.21, 450, 455, 522
See application file for complete search history.

(56) References Cited

U.S. PATENT DOCUMENTS

| | | | |
|---|---|---|---|
| 5,461,669 A * | 10/1995 | Vilain | 379/350 |
| 6,449,284 B1 * | 9/2002 | Hagirahim | 370/466 |
| 6,608,832 B2 * | 8/2003 | Forslow | 370/353 |
| 6,618,378 B1 * | 9/2003 | Giroux et al. | 370/395.1 |
| 6,765,912 B1 * | 7/2004 | Vuong | 370/395.2 |
| 7,002,919 B1 * | 2/2006 | El-Sayed | 370/252 |
| 7,203,163 B1 * | 4/2007 | Hundscheidt et al. | 370/230 |
| 7,236,787 B1 * | 6/2007 | Tamura et al. | 455/437 |
| 2001/0043624 A1 * | 11/2001 | Saito et al. | 370/524 |
| 2001/0053145 A1 * | 12/2001 | Willars et al. | 370/352 |
| 2002/0059411 A1 * | 5/2002 | Barnhouse et al. | 709/223 |
| 2002/0120749 A1 * | 8/2002 | Widegren et al. | 709/227 |
| 2003/0125041 A1 * | 7/2003 | Stippel | 455/455 |
| 2003/0161325 A1 * | 8/2003 | Kekki | 370/395.43 |

FOREIGN PATENT DOCUMENTS

WO    WO 0005913    2/2000

* cited by examiner

Primary Examiner — Phuc Tran

(57) ABSTRACT

The present invention relates generally to telecommunication services, and in particular, to communicating priority indications between telecommunication nodes in a telecommunication system having a separated call control and bearer control architecture. The present invention provides a number of solutions which map or assign the call level priority to the bearer level.

29 Claims, 3 Drawing Sheets

SYSTEM AND METHOD OF COMMUNICATING A PRIORITY INDICATION IN A CALL CONTROL/BEARER CONTROL TELECOMMUNICATION SYSTEM

FIELD OF INVENTION

The present invention relates generally to telecommunication services and, in particular, to communicating priority indications between telecommunication nodes in a telecommunication system having a separated call control and bearer control architecture.

BACKGROUND ART

For cost-efficiency reasons telecommunication operators are increasingly deploying non-STM (non-Synchronous Transfer Mode) transport technologies inside their networks. Examples of these technologies are ATM (Asynchronous Transfer Mode), IP (Internet Protocol), and FR (Frame Relay). Therefore, a standardised solution is required to support existing services of today's public telecommunication networks over multi-vendor non-STM infrastructures. In the current public telecommunication networks, the call control (CC) and bearer control (BC) are tightly coupled in the same public network protocol, for example, ISUP (ISDN User Part). As a result of this trend to run over multi-vendor non-STM infrastructures, a new network architecture has been developed that allows for the splitting or separating of call control (CC) and bearer control (BC) into separate protocols. FIGS. 1a and 1b show the evolution from current integrated CC/BC public network protocols such as ISUP, to the separated CC/BC solution.

The split of CC and BC functions results in a new interface exposed between the CC function and BC function. A protocol is required to enable the coupling between the CC and BC functions when a telecommunications node is implemented in a separated environment. As an example, the International Telecommunications Union-Telecommunications Sector (ITU-T) and the Internet Engineering Task Force (IETF) have defined a Gateway Control Protocol to enable the coupling between the CC and BC functions. This protocol is designed to control multimedia connections from a remote control entity and operatively resides between the CC functionality and the BC functionality, as shown in FIGS. 1a and 1b. Variants of this protocol are known as H.248 and Q.1950 in the ITU, and Megaco in the IETF.

As a result of the separation of Call Control and Bearer Control, a number of functions which existed in the integrated CC/BC environment require the functionality to be duplicated in the Call Control and the Bearer Control environment. One such function is the "Priority Call" function, which is used, for example, in emergency call situations. The definition of the "Priority Call" function may be found in ITU-T Recommendation I.255.4, Priority Service. In such emergency situations, it is absolutely necessary for emergency calls to progress, but it is not necessary that normal calls progress. Typically, this could be achieved in, for example, one of two ways.

Firstly, if a node receives an emergency call and it has reached its limit of call throughput, the way to allow this emergency call to progress would be to sacrifice, that is terminate, an existing normal call to free up the resources required for the emergency call. Secondly, a node may reserve a certain percentage, for example 2%, of its resources for use by emergency calls only. This means that normal calls cannot use those particular resources. The consequence of this is that in non-emergency situations, the node is running at a suboptimal capacity. In the example given in this case, 98%. In both of the above examples, it is necessary for the emergency call to be marked as a priority call so that the node can identify the emergency call as such. In the separated CC/BC architecture discussed above, this applies to both call and bearer control protocols, as illustrated in FIG. 2.

In the network configuration of FIG. 2, the call and bearer connections are initiated at Node 1 and terminated at Node 5. The call control traverses the network via Node 3 or path C1-C2 as shown, whereas the bearer control traverses the network via Nodes 2 and 4 or path B1-B2-B3 as shown. To illustrate the emergency call scenario, it is assumed that all nodes and paths are running at or near to full capacity for emergency calls, and a certain percentage of resources on all nodes and paths are reserved for emergency calls. In this particular example, Node 1 initiates an emergency call, and, since it is running at full capacity, it may not use the normal call set up paths. Hence, it selects a path for both the Call Control and Bearer Control, which is reserved for emergency calls, that is, path C1 and path B1, respectively. Similarly, Node 3 should recognise the call as an emergency call and select its internal resources and outgoing path to Node 5 or path C2, appropriately. Likewise, Node 2 should recognise the fact that the bearer path being requested is related to an emergency call, and thus should select its internal resources and outgoing path to Node 4 or path B2, appropriately.

In a separated CC and BC architecture, only the Call Control protocol has an indication that the call has a certain priority. One method of transporting this priority information in the protocol is by the BICC (Bearer Independent Call Control) Precedence indication.

BICC is based on ISUP (Integrated Services Digital Network User Part. That is, the control part of the Signalling System No. 7 protocol, SS7), which is a combined CC/BC protocol. MLPP (Multi-Level Precedence and Preemption Service) is a function in BICC/ISUP. A detailed description of the MLPP is found at ITU-T Recommendation I.255.3 Multilevel Precedence and Preemption Service (MLPP), and ITU-T Recommendation Q.1902.3, Bearer independent call control protocol (CS2) and Signalling System No. 7—ISDN user part formats and codes.

There are currently five Precedence values defined in the BICC protocol, namely flash-override, flash, immediate, priority and routine, which are assigned values 0 to 4 respectively. The Call Control protocol provides for an indication of call priority. Currently the only way Node 2, or Node 4, is aware that the requested bearer set-up is related to an emergency call is that the request is entered on path B1 (or B2). This requires path reservation at a call set up. It thus requires prior network configuration knowledge in Node 2, and also Node 4, which is not always possible or practical in modern switching and non-switching networks, and may require complicated Operation and Maintenance procedures It is an object of the present invention to overcome or ameliorate at least one of the problems of the prior art.

SUMMARY OF INVENTION

In one aspect, the present invention provides in a separated call control, bearer control telecommunications network, a method of communicating a call control level priority indication between a first telecommunications node and a second telecommunications node via the bearer network including the steps of:

1) determining a call control level priority indication;
2) assigning a bearer level priority indication to a priority indication field in a bearer network protocol message in accordance with a priority level of a bearer network protocol;
3) transmitting the bearer network protocol message within the bearer network via bearer network nodes intermediate the first and second telecommunication nodes.

Preferably, the bearer level indication corresponds to the call control level indication.

In essence, the present invention stems from the realisation that assigning, in accordance with a dedicated relationship, a call control level priority indication to a bearer priority indication in a bearer network protocol message field in accordance with a priority mechanism of the bearer network protocol, allows for an explicit indication of priority at the bearer level in a separated network architecture. Thus, a solution is provided which maps or assigns the call level priority, for example in the form of the BICC Precedence values, to the bearer level.

The call control level priority indication is preferably determined from at least one of a call set up message, and, a subscriber profile.

In another aspect, the present invention provides in a telecommunication system having separated Call Control and Bearer Control architecture:
  a method for enabling transmission of a call control level priority indication along at least a portion of a path of communication established between a first telecommunication node and a second telecommunication node, the path of communication including at least one bearer network node,
  the method including:
  mapping, in accordance with a dedicated relationship, a call control level priority indication to a bearer priority indication in a bearer network protocol message field in accordance with the following steps:
  a) determining a Bearer Independent Call Control priority value;
  b) determining a priority level in a bearer network for a message to be communicated in the bearer network based on the determination in step a).

In a further aspect, the present invention provides in a telecommunication system, the system including a separated Call Control and Bearer Control architecture between a first telecommunication node and a second telecommunication node, an improvement including:
  1) call control level priority determining means adapted to determine a call control level priority indication;
  2) logic means adapted to logically map the call control level priority indication to a priority indication field in a bearer network message in accordance with a priority level of a bearer network protocol;
  3) a transmitter adapted to transmit the bearer network protocol message within a bearer network via bearer network nodes intermediate the first and second telecommunication nodes.

In yet another aspect, the present invention provides a network node of a telecommunication system, the system including a separated Call Control and Bearer Control architecture, the node including:
  1) call control level priority determining means adapted to determine a call control level priority indication;
  2) logic means adapted to logically map the call control level priority indication to a priority indication field in a bearer network protocol message in accordance with a priority level of a bearer network protocol.

In another aspect, the present invention provides a bearer network protocol data unit for use in a telecommunications system having a separated Call Control and Bearer Control architecture, the bearer protocol data unit including:
  a data payload field for communicating user data, and
  at least one header field including a priority indication field serving to provide a priority designation of the bearer protocol data unit, characterised in that, the priority indication field includes an attribute based on a call control level priority indication for a call set up message.

In still another aspect, the present invention provides a computer program product including:
  a computer usable medium having computer readable program code and computer readable system code embodied on said medium for transliterating a call control message between a first node and a second node within a telecommunication system via a bearer network in a separated call control and bearer control telecommunication network, said computer program product including:
  computer readable code within said computer usable medium for:
  determining a call control level priority indication for a call set up message, and
  mapping, in accordance with a dedicated relationship, a call control level priority indication to a bearer priority indication in a bearer network protocol message field in accordance with a priority mechanism of a bearer network protocol.

The call control level priority indication, in a preferred embodiment is assigned to a received call set up message. In another preferred embodiment, the call control level priority indication is assigned in accordance with a subscriber profile.

The method of the present invention may further include the steps of:
  allocating internal resources of the bearer network for communicating the bearer network protocol message dependent on the bearer level priority indication.

Further, the step of determining the call control level priority indication or the step of assigning a corresponding call control level priority indication may be performed at the first telecommunication node or at any node or nodes intermediate the first and second nodes.

Preferably, at least one of the call control level indication or the corresponding call control level indication is determined in accordance with a first or second predetermined designation, respectively. The first designation is, preferably, a call control protocol indication and the second designation is, preferably, a bearer protocol indication or bearer control protocol indication.

Preferably, the call control protocol is the Bearer Independent Call Control (BICC) and the call control level priority indication is an I.255.3 Multi-level Precedence and Pre-emption Service (MLPP) indication, or a new field based on the requirements from the I.255.4 Priority Service.

In one example, the bearer network may be a switched AAL2 bearer network and the bearer network protocol message may be a Q2630.2 AAL2 ERQ message. In another example the bearer network may be a non-switched bearer network and the bearer network protocol message may transmitted by at least one Ipv4 or Ipv6 packet.

DESCRIPTION OF PREFERRED EMBODIMENT

A preferred embodiment of the present invention will now be described with reference to the accompanying drawings, in which.

An indication of call control level priority may be determined on a call by call basis or in accordance with a predesignated subscriber profile. In the call by call basis example, the call control level priority indication is determined from a call set up message.

There are two types of bearer network configurations available in the existing telecommunication network specifications of the separated CC and BC architecture. These are switched and non-switched networks. A switched network is one where the bearer path is defined at the time of call set-up, and all user data is transferred along that path for the duration of the call. A non-switched network is one whereby the bearer path is not defined at call set-up, and decisions are made in real-time as to the path that user data is communicated. An example of a switched network is one where the bearer is MAI (ATM Adaption layer 2), whereby the bearer is connected through one or more AAL2 switches and the path of the user packets through the switches is defined at the time of call set-up. Detail on the AAL2 bearer protocol is found at ITU-T Recommendation Q.2630.2, AAL Type 2 Signalling Protocol. Further examples of possible bearer control protocols for a switched network as in a switched BICC network include, AAL1 (ATM Adaption Layer 2), PNNI (Private Network to Network Interface), DSS2 (Digital Subscriber Signaling #2 for ATM broadband signaling), B-ISUP (Broadband ISUP). An example of a non-switched network is one where the bearer is IP (Internet Protocol), where the user packets are transferred through IP routers, where the path of the user packets through the network is decided by the IP routers in real-time. Detail on the IP bearer protocol is found, for example, at RFC791, Internet Protocol (Ipv4). In a non-switched network, each packet takes a different path through the IP network. Further examples of possible bearer protocols for a non-switched network, as in a non-switched BICC network include, Structured AAL1 (see I.363.1) and Trunked AAL2 (see Q.2630.1, Annex A). A person skilled in the art would recognise that other bearer network protocols can be used in associated with the invention, without departing from the spirit of the present invention.

Switched Network

Figure 1A:
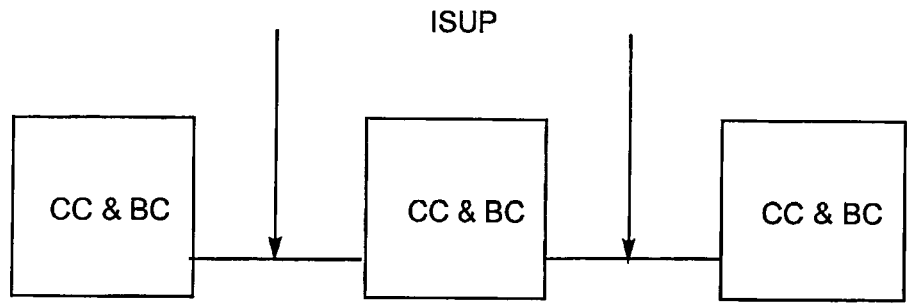
FIGS. 1a and 1b show the evolution from previous integrated Call Control and Bearer Control public network protocols to a separated Call Control and Bearer Control public network architecture.
Figure 1B:
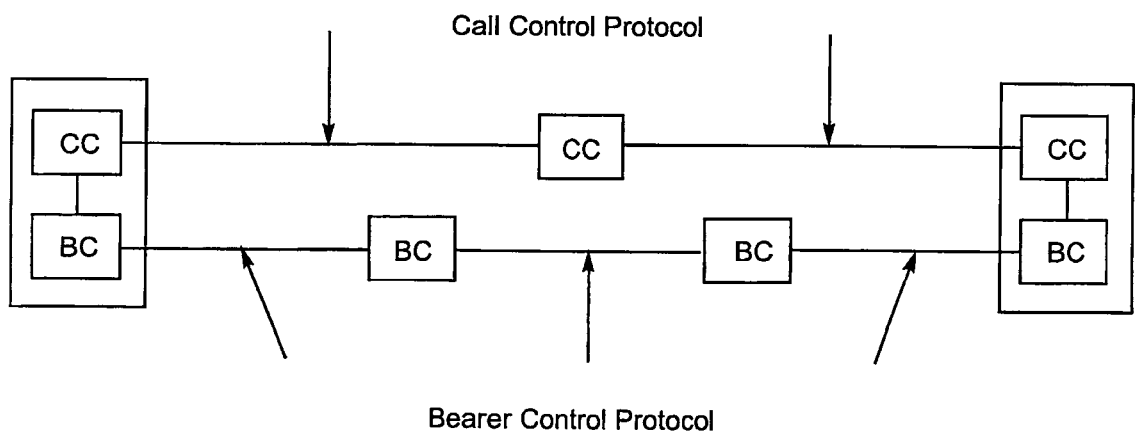
Figure 2:
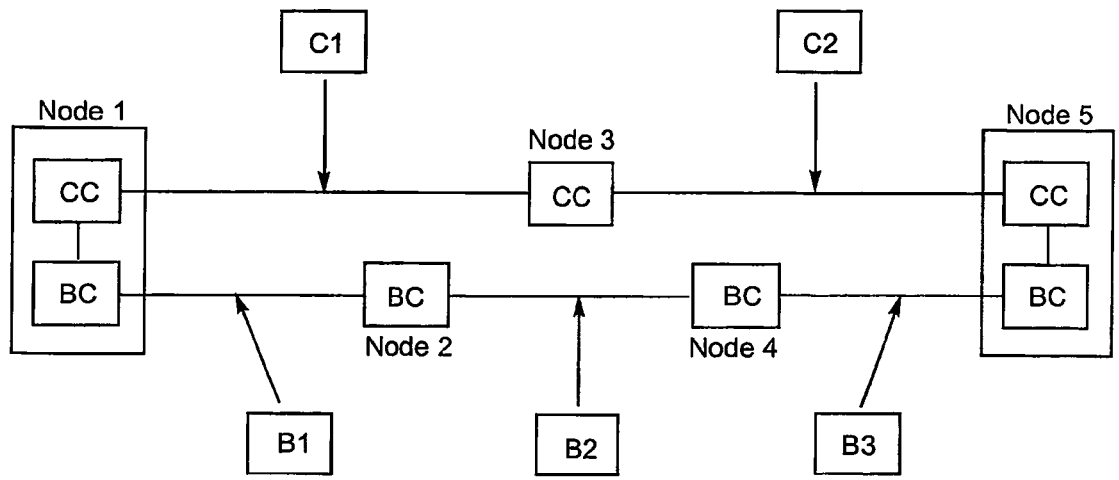
FIG. 2 shows a separated Call Control and Bearer Control network architecture of the prior art.
Figure 3:
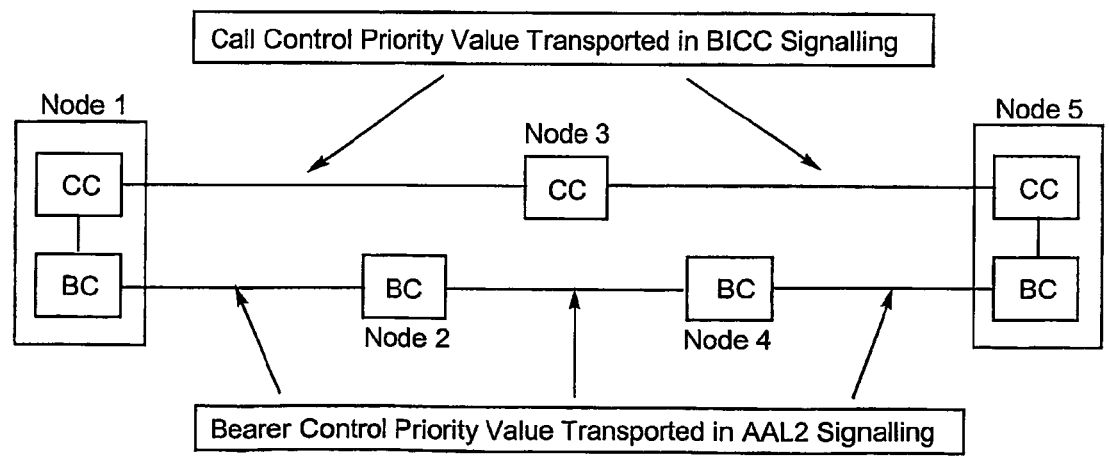
FIG. 3 shows an example of call level priority indications communicated via a bearer network in accordance with a first preferred embodiment of the present invention.
Figure 4:
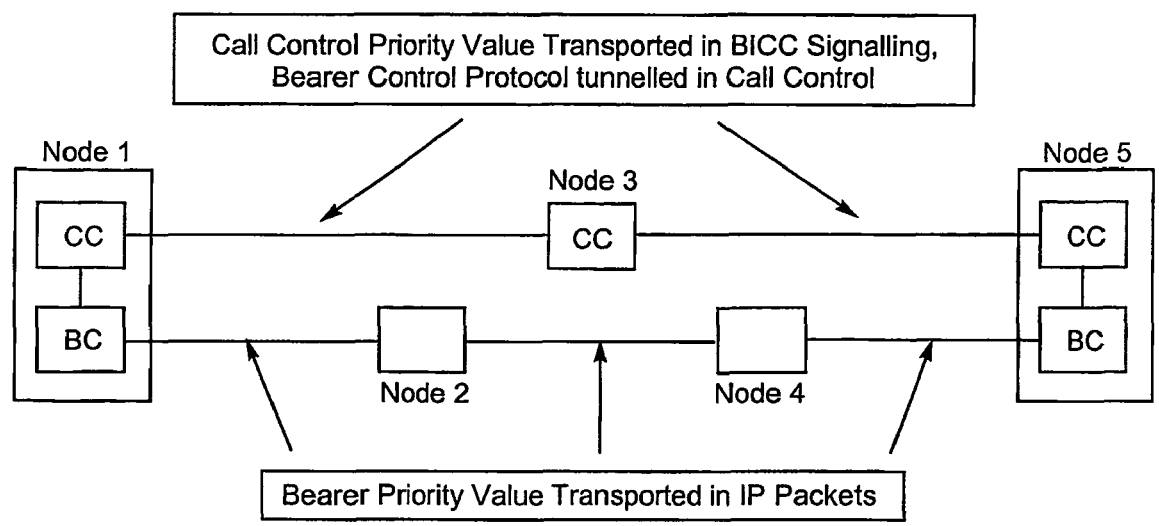
FIG. 4 shows an example of call level priority indications communicated via a bearer network in accordance with a second preferred embodiment of the present invention.

In a switched bearer network such as an AAL2 switched network, the Bearer Control Protocol is carried through and processed at the switches in the bearer network. The Bearer Control Protocol carries a priority indication through the bearer network in the bearer establishment message in order for each switch to recognise the priority of the call. This can be of the form of, say a value of 0-4, with 4 indicating highest priority and 0 indicating lowest priority. Referring to FIG. 3, in the AAL type 2 signalling protocol, this is preferably in the simple form of a value of 0 to 4 in the ERQ message. Nodes in the bearer network use this value to allocate internal resources and outgoing paths according to particular network conditions. For example, Node 2 can immediately recognise the priority level from the incoming message and route the call to Node 4 along an "emergency-marked" path between the two nodes.

In the present invention, the call control level priority indication is determined and assigned or mapped to a bearer level priority indication field in a bearer network protocol message. In one form, the value of the priority indicator in the Q.2630.2 ERQ message is mapped from the BICC Call Control Priority value. This mapping is done in the initiating node, Node 1. In other preferred embodiments, the invention is embodied by the mapping being performed at any one or a combination of node(s) intermediate a first transmitting node or endpoint and a second receiving node or endpoint for the call. Table 1, below illustrates this mapping.

TABLE 1

| BICC Call Control Priority Value (e.g. MLPP value) | Bearer Control Priority Value (e.g. in Q.2630) |
|---|---|
| Flash Override (0) | 0 |
| Flash (1) | 1 |
| Immediate (2) | 2 |
| Priority (3) | 3 |
| Normal (4) | 4 |

Whilst the values can be mapped exactly, it is also within the scope of the invention to set the CC and BC Priority values to different values according to the importance of the particular priority call, network configuration, and current network usage. The person skilled in the art would derive variants without limiting the scope of the invention.

Non-Switched Network

In a non-switched network, such as an IP network, the Bearer Control Protocol is carried, or tunnelled inside the Call Control Protocol. Detail on an example Bearer Control Protocol for IP networks is found at ITU-T Recommendation Q.1970, BICC IP Bearer Control Protocol. The Bearer Control Protocol is not passed through the bearer network, that is, it is not seen by the routers in the bearer network. The protocol allocates resources in the network. Due to the nature of a non-switched network, each user packet, in this case IP packet, carries an indication of the priority in order for each router to be able to route the packet according to the priority. Other bearer control protocols can be used as would be understood by a person skilled in the art.

In order to obtain the full priority indication required, which is similar to that of a switched network, the call control level priority indication is determined and then assigned or mapped between the BICC Call Control Priority values and the values carried in the IP packet. A field already exists in the IP header, as an example see RFC791, Internet Protocol (Ipv4), which carries this priority, an 8-value field called "Priority". This is, in turn, carried inside the "Type of Service" field. An example of this mapping is shown below in table 2.

As in the example of a switched Network, the present invention may be embodied by this mapping being performed at, or by means within the initiating or transmitting node, for example Node 1. In another preferred embodiment, the invention may be embodied by the mapping being performed at any one or a combination of node(s) intermediate a first transmitting node or endpoint and a second receiving node or endpoint for the call.

TABLE 2

| BICC Call Control Priority Value (e.g. MLPP value) | IP Precedence Value (e.g. in IP Header, Type of Service field) |
|---|---|
| Flash Override (0) | Flash Override (4) |
| Flash (1) | Flash (3 |
| Immediate (2) | Immediate (2) |
| Priority (3) | Priority (1) |
| Normal (4) | Routine (0) |

As a further example, there are three further values of the IP Precedence field, namely "Network Control (7)", "Internetwork Control (6)", and "CRITIC/ECP (5)" that are not used in the above tabled example. However it is possible to define a mapping from a specific BICC priority value to one of these values. For example, a BICC Priority value for Flash Override (0), is mapped to an IP Priority value for Network Control (7). As in the switched network case, the specifics of this mapping are in accordance with the importance of the particular priority call, network configuration, and current network usage.

The call control level priority indication is determined by a first designation. The bearer level priority indication is determined by a second designation. Tables 1 and 2 above provide examples. Furthermore, the first designation can be a BICC indication and the second designation can be a bearer network control Protocol indication. A skilled person would understand that variations are possible within the scope of the present invention.

In a further embodiment of the present invention, the call control priority level indication is processed from the bearer network level to the call control network level by way of decoding/recovery in which the bearer network priority level is determined and assigned to a call control level priority indication of a call, call message or assigned in accordance with a subscriber profile. This process is performed at a second or receiving node or endpoint. In a further embodiment, the process is performed at a node(s) intermediate a first transmitting node and a second receiving node where the intermediate node provides a Call Control function.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims.

The invention claimed is:

1. In a separated call control, bearer control telecommunications network, a method of communicating a call control level priority indication between a first telecommunications node and a second telecommunications node via the bearer network comprising the steps of:
   determining a call control level priority indication, the call control level priority indication being determined in accordance with a first predetermined designation;
   mapping the call control level priority indication to a bearer level priority indication of a priority indication field in a bearer network protocol message in accordance with a priority level of a bearer network protocol; and
   transmitting the bearer network protocol message within the bearer network via bearer network nodes intermediate the first and second telecommunication nodes.

2. A method as claimed in claim 1, wherein the call control level priority indication is determined from a call set up message.

3. A method as claimed in claim 1, wherein the call control level priority indication is determined from a subscriber profile.

4. A method as claimed in claim 1, further comprising the step of:
   allocating internal resources of the bearer network for communicating the bearer network protocol message dependent on the bearer level priority indication.

5. A method as claimed in claim 1, wherein at least one of the steps of determining the call control level priority indication and mapping the call control level priority indication to a bearer level priority indication is performed at the first telecommunication node.

6. A method as claimed in claim 1, wherein at least one of the steps of determining the call control level priority indication and mapping the call control level priority indication to a bearer level priority indication is performed at a node(s) intermediate the first node and the second node.

7. A method as claimed in claim 1, wherein the bearer network is a switched bearer network and the bearer network protocol message is a switched bearer network protocol message.

8. A method as claimed in claim 1, wherein the bearer network is a non-switched bearer network and the bearer network protocol message is a non-switched bearer network protocol message.

9. A method as claimed in claim 1, wherein, the bearer level priority indication is determined in accordance with a second predetermined designation.

10. A method as claimed in claim 9, wherein the second predetermined designation is at least one of a bearer network control protocol indication, and a bearer network protocol indication and the call control level priority indication is at least one of a Multi-Level Precedence and Pre-emption service (MLPP) indication, and an indication based on requirements of a Priority Service.

11. A method as claimed in claim 1, wherein the first predetermined designation is a Bearer Independent Call Control (BICC) protocol indication and the call control level priority indication is at least one of a Multi-level Precedence and Pre-emption Service (MLPP) indication, and an indication based on requirements of a Priority Service.

12. A network node of a telecommunication system for communicating a call control level priority indication between a first telecommunications node and a second telecommunications node, the system including a separated Call Control and Bearer Control architecture, the node comprising:
   Call control level priority determining means for determining the call control level priority indication, the call control level priority indication being determined in accordance with a first predetermined designation;
   logic means for mapping the call control level priority indication to a priority indication field in a bearer network message in accordance with a priority level of a bearer network protocol; and
   transmitter means for transmitting the bearer network message within the Bearer Control architecture via bearer network nodes intermediate the first and second telecommunications nodes.

13. A network node as claimed in claim 12, wherein the call control level priority indication is determined from a call set up message.

14. A network node as claimed in claim 12, wherein the call control level priority indication is determined from a subscriber profile.

15. A network node as claimed in claim 12, wherein internal resources of the bearer network for communicating the bearer network protocol message are allocated dependent on the bearer level priority indication.

16. A network node as claimed in claim 12, wherein the bearer network is a switched bearer network and the bearer network protocol message is a switched bearer network protocol message.

17. A network node as claimed in claim 12, wherein the bearer level priority indication is determined in accordance with a second predetermined designation.

18. A network node as claimed in claim 17, wherein the second predetermined designation is at least one of a bearer network control protocol indication and a bearer network protocol indication and the call control level priority indication is at least one of a Multi-level Precedence and Pre-emption Service (MLPP) indication, and an indication based on requirements of a Priority Service.

19. A network node as claimed in claim 12, wherein the first predetermined designation is a Bearer Independent Call Control (BICC) protocol indication and the call control level priority indication is at least one of a Multi-level Precedence and Pre-emption Service (MLPP) indication, and an indication based on requirements of a Priority Service.

20. A computer program apparatus including a non-transitory computer readable medium having computer readable program code and computer readable system code embodied on said medium executed by said computer for transliterating a call control message between a first node and a second node within a telecommunication system via a bearer network in a separated call control and bearer control telecommunication network, comprising:
   computer readable code within said computer usable medium for:
      determining a call control level priority indication for a call set up message, the call control level priority indication being determined in accordance with a first predetermined designation;
      mapping, in accordance with a dedicated relationship, a call control level priority indication to a bearer priority indication in a bearer network protocol message field in accordance with a priority mechanism of a bearer network protocol; and
      transmitting the bearer network protocol message within the bearer network via bearer network nodes intermediate the first and second telecommunication nodes.

21. A computer program apparatus as claimed in claim 20, wherein the call control level priority indication is determined from the call set up message.

22. A computer program apparatus as claimed in claim 20, wherein the call control level priority indication is determined from a subscriber profile.

23. A computer program apparatus as claimed in claim 20, said computer program product further including computer readable code within said computer usable medium for allocating internal resources of the bearer network for communicating the bearer network protocol message dependent on the bearer level priority indication.

24. A computer program apparatus as claimed in claim 20, wherein at least one of the steps of determining the call control level priority indication and mapping the call control level priority indication to a bearer level priority indication is preformed at the first telecommunication node.

25. A computer program apparatus as claimed in claim 20, wherein at least one of the steps of determining the call control level priority indication and mapping the call control level priority indication to a bearer level priority indication is preformed at a node(s) intermediate the first node and the second node.

26. A computer program apparatus as claimed in claim 20, wherein the bearer network is a switched bearer network and the bearer network protocol message is a switched bearer network protocol message.

27. A computer program apparatus as claimed in claim 20, wherein the bearer level priority indication is determined in accordance with a second predetermined designation.

28. A computer program apparatus as claimed in claim 27, wherein the second predetermined designation is at least one of a bearer network control protocol indication, and a bearer network protocol indication and the call control level priority indication is at least one of a Multi-level Precedence and Pre-emption Service (MLPP) indication, and an indication based on requirements of a Priority Service.

29. A computer program apparatus as claimed in claim 20, wherein the first predetermined designation is a Bearer Independent Call Control (BICC) protocol indication and the call control level priority indication is at least one of a Multi-level Precedence and Pre-emption Service (MLPP) indication, and an indication based on requirements of a Priority Service.

* * * * *

UNITED STATES PATENT AND TRADEMARK OFFICE
CERTIFICATE OF CORRECTION

PATENT NO.         : 7,912,079 B2                                    Page 1 of 1
APPLICATION NO.    : 10/494831
DATED              : March 22, 2011
INVENTOR(S)        : Rytina et al.

It is certified that error appears in the above-identified patent and that said Letters Patent is hereby corrected as shown below:

In Column 5, Line 26, delete "MAI" and insert -- AAL2 --, therefor.

Signed and Sealed this
Third Day of April, 2012

David J. Kappos
*Director of the United States Patent and Trademark Office*